US012719131B2

(12) United States Patent
Yadav et al.

(10) Patent No.: US 12,719,131 B2
(45) Date of Patent: Aug. 25, 2026

(54) THERMAL RUNAWAY MITIGATION BATTERY MODULE

(71) Applicant: GM GLOBAL TECHNOLOGY OPERATIONS LLC, Detroit, MI (US)

(72) Inventors: Anil Yadav, Troy, MI (US); Julian Roy Sherborne, South Lyon, MI (US); Wei Zeng, Oakland Township, MI (US); Scott W. Lananna, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 285 days.

(21) Appl. No.: 18/440,318

(22) Filed: Feb. 13, 2024

(65) Prior Publication Data

US 2025/0260121 A1 Aug. 14, 2025

(51) Int. Cl.
*H01M 50/358* (2021.01)
*B60L 50/64* (2019.01)
(Continued)

(52) U.S. Cl.
CPC ........... *H01M 50/358* (2021.01); *B60L 50/64* (2019.02); *H01M 10/658* (2015.04);
(Continued)

(58) Field of Classification Search
CPC ............. H01M 50/358; H01M 10/658; H01M 50/204; H01M 50/271; H01M 50/3425;
(Continued)

(56) References Cited

U.S. PATENT DOCUMENTS 12,046,773 B2 7/2024 Yadav et al.
2015/0107914 A1* 4/2015 Zhao ...................... B60L 15/20
(Continued)

FOREIGN PATENT DOCUMENTS

DE 102019201126 A1 7/2020
DE 102021122524 A1 3/2022
(Continued)

OTHER PUBLICATIONS

DE Office Action for Appln No. 10 2024 109 368.4 dated Sep. 9, 2024, 8 pages.

*Primary Examiner* — Brodie J Follman
(74) *Attorney, Agent, or Firm* — CANTOR COLBURN LLP

(57) ABSTRACT

Embodiments include a battery module having a first battery cell, a neighboring second battery cell, and insulating members positioned on opposing sides of the first battery cell. The battery module also includes a battery module enclosure surrounded by an external environment and configured to house each of the first battery cell, the neighboring second battery cell, and the insulating members and a module cover mounted to the battery module enclosure and including a vent feature configured to expel high-temperature gases from the first battery cell into the external environment, to thereby minimize transfer of the high-temperature gases from the first battery cell to the neighboring second battery cell and control propagation of a thermal runaway event in the battery module. The insulating members include tapered portions disposed between the first battery cell and the vent feature.

20 Claims, 7 Drawing Sheets

(51) Int. Cl.
*H01M 10/658* (2014.01)
*H01M 50/204* (2021.01)
*H01M 50/271* (2021.01)
*H01M 50/342* (2021.01)

(52) U.S. Cl.
CPC ....... *H01M 50/204* (2021.01); *H01M 50/271* (2021.01); *H01M 50/3425* (2021.01); *H01M 2220/20* (2013.01)

(58) Field of Classification Search
CPC ........... H01M 2220/20; H01M 10/625; H01M 50/209; H01M 50/367; B60L 50/64
See application file for complete search history.

(56) References Cited

U.S. PATENT DOCUMENTS

| | | | | |
|---|---|---|---|---|
| 2020/0099114 | A1 | 3/2020 | Ryu et al. | |
| 2022/0069377 | A1 | 3/2022 | Rhee et al. | |
| 2022/0416359 | A1* | 12/2022 | Feltham | H01M 50/30 |
| 2023/0136430 | A1 | 5/2023 | Palmer et al. | |
| 2024/0204342 | A1* | 6/2024 | Groot | H01M 50/367 |

FOREIGN PATENT DOCUMENTS

| | | | |
|---|---|---|---|
| DE | 102022123177 | A1 | 5/2023 |
| DE | 102022125202 | A1 | 6/2023 |
| DE | 202022002863 | U1 | 10/2023 |
| KR | 20230016532 | A | 2/2023 |
| WO | WO2021156095 | * | 8/2021 |
| WO | WO2023279089 | * | 1/2023 |

* cited by examiner 40
42
26
Z
Y
X
31
31-2
31-1
31-1
28-2
46-2
30
31-2
54
46-1
44
31-2
28-1
48
38
32
34-1
34-2

40
42
26
Z
Y
X
28-2
46-2
30
6
54
44
46-1
34-2
34-1
32
28-1
48
38

40
42
26
Z
Y
X
31
31-2
31-1
31-1
46-2
28-2
30
54
46-1
44
31-2
48
38
28-1
34-2
34-1
32

THERMAL RUNAWAY MITIGATION BATTERY MODULE

INTRODUCTION

The present disclosure relates to a battery module configured to remove heat and mitigate a thermal event.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and affect the entire battery array.

SUMMARY

In one exemplary embodiment, a battery module is provided. The battery module includes a first battery cell, a neighboring second battery cell, and insulating members positioned on opposing sides of the first battery cell and a battery module enclosure surrounded by an external environment and configured to house each of the first battery cell, the neighboring second battery cell, and the insulating members. The battery module also includes a module cover mounted to the battery module enclosure and including a vent feature configured to expel high-temperature gases from the first battery cell into the external environment, to thereby minimize transfer of the high-temperature gases from the first battery cell to the neighboring second battery cell and control propagation of a thermal event in the battery module. The insulating members include tapered portions disposed between the first battery cell and the vent feature, the tapered portions being configured to direct the high-temperature gases from the first battery cell away from the neighboring second battery cell and towards the vent feature.

In addition to the one or more features described herein the vent feature includes exhaust openings configured to expel the high-temperature gases from the first battery cell.

In addition to the one or more features described herein the at least one of the exhaust openings has a reverse scoop shape configured to direct the high-temperature gases away from the neighboring second battery cell.

In addition to the one or more features described herein the vent feature includes liner segments configured to cover the exhaust openings and be blown off the exhaust openings by the high-temperature gases to thereby expel the high-temperature gases from the first battery cell to the external environment.

In addition to the one or more features described herein the liner segments are glued to the battery module cover.

In addition to the one or more features described herein the liner segments are constructed from mica.

In addition to the one or more features described herein the insulating members are constructed from mica.

In addition to the one or more features described herein further including a thermal barrier disposed adjacent to the insulating members.

In addition to the one or more features described herein the insulating members include a body portion that extends along a height of the first battery cell.

In addition to the one or more features described herein the at least part of the tapered portions of the insulating members overlap each other and are configured to deform and to contact the vent feature in response to the high-temperature gases being expelled from the first battery cell.

In one exemplary embodiment, a motor vehicle is provided. The motor vehicle includes a power-source configured to generate power-source torque and a battery module configured to supply electrical energy to the power-source. The battery module includes a first battery cell, a neighboring second battery cell, and insulating members positioned on opposing sides of the first battery cell and a battery module enclosure surrounded by an external environment and configured to house each of the first battery cell, the neighboring second battery cell, and the insulating members. The battery module also includes a module cover mounted to the battery module enclosure and including a vent feature configured to expel high-temperature gases from the first battery cell into the external environment, to thereby minimize transfer of the high-temperature gases from the first battery cell to the neighboring second battery cell and control propagation of a thermal event in the battery module. The insulating members include tapered portions disposed between the first battery cell and the vent feature, the tapered portions being configured to direct the high-temperature gases from the first battery cell away from the neighboring second battery cell and towards the vent feature.

In addition to the one or more features described herein the vent feature includes exhaust openings configured to expel the high-temperature gases from the first battery cell.

In addition to the one or more features described herein the at least one of the exhaust openings has a reverse scoop shape configured to direct the high-temperature gases away from the neighboring second battery cell.

In addition to the one or more features described herein the vent feature includes liner segments configured to cover the exhaust openings and be blown off the exhaust openings by the high-temperature gases to thereby expel the high-temperature gases from the first battery cell to the external environment.

In addition to the one or more features described herein the liner segments are glued to the battery module cover.

In addition to the one or more features described herein the liner segments are constructed from mica.

In addition to the one or more features described herein the insulating members are constructed from mica.

In addition to the one or more features described herein further including a thermal barrier disposed adjacent to the insulating members.

In addition to the one or more features described herein the insulating members include a body portion that extends along a height of the first battery cell.

In addition to the one or more features described herein the at least part of the tapered portions of the insulating members overlap each other and are configured to deform and to contact the vent feature in response to the high-temperature gases being expelled from the first battery cell.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
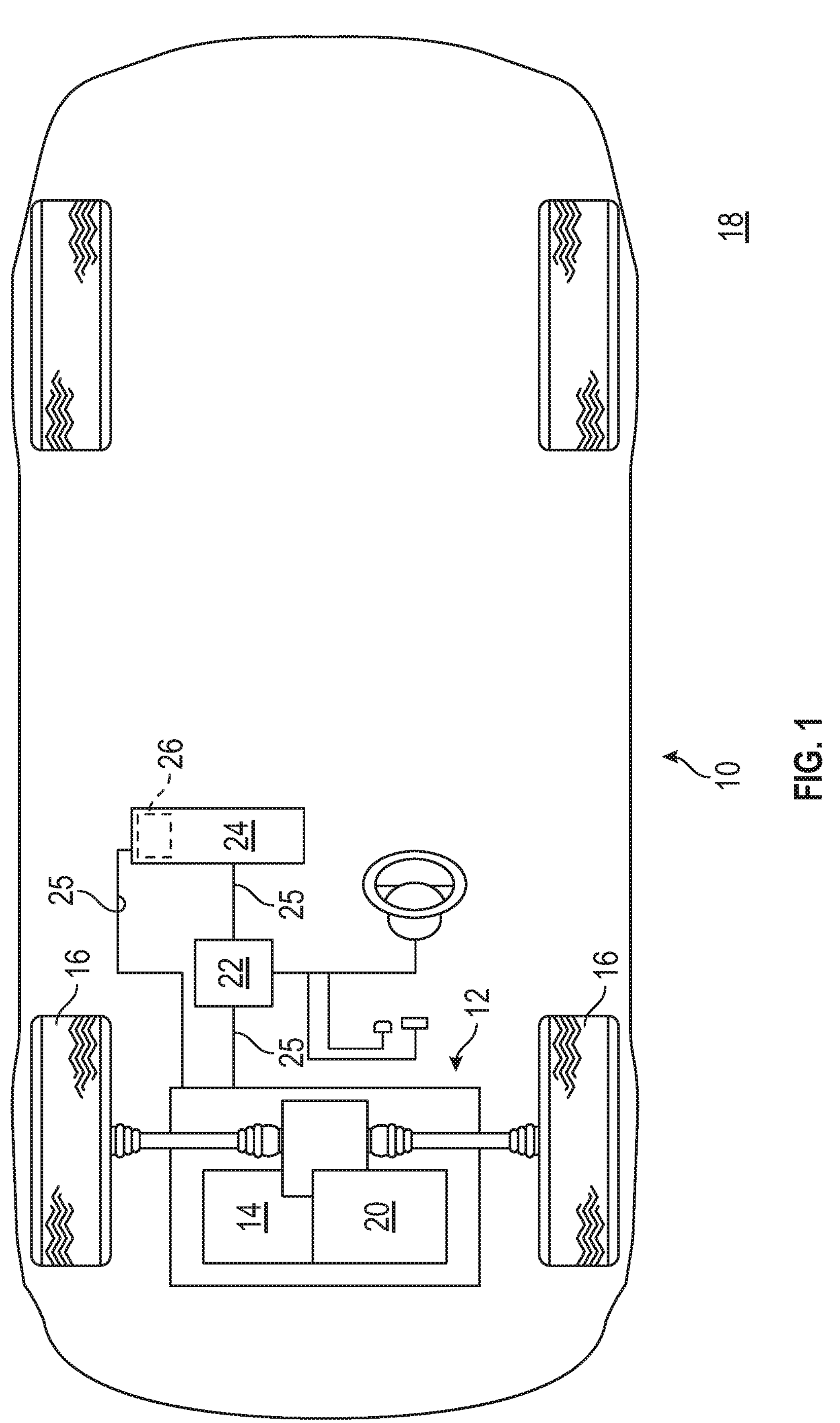
FIG. 1 is a schematic top view of an embodiment of a motor vehicle employing multiple power sources and a battery system having battery cells arranged in module(s) configured to generate and store electrical energy.

The following description is merely exemplary in nature and is not intended to limit the present disclosure, its application or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings.

These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train, or the like. It is also contemplated that the vehicle 10 may be a mobile platform, such as an airplane, all-terrain vehicle (ATV), boat, personal movement apparatus, robot, and the like to accomplish the purposes of this disclosure. The powertrain 12 includes a power-source 14 configured to generate a power-source torque T for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or a powertrain control module (PCM) configured to control the powertrain 12 to generate a predetermined amount of power-source torque T. The battery system 24 may be connected to the power-sources 14 and 20, the electronic controller 22, as well as other vehicle systems via a high-voltage BUS 25. Although the battery system 24 is described herein primarily with respect to a vehicle environment, nothing precludes the subject battery system from being employed to power other, non-automotive systems.

Figure 2:
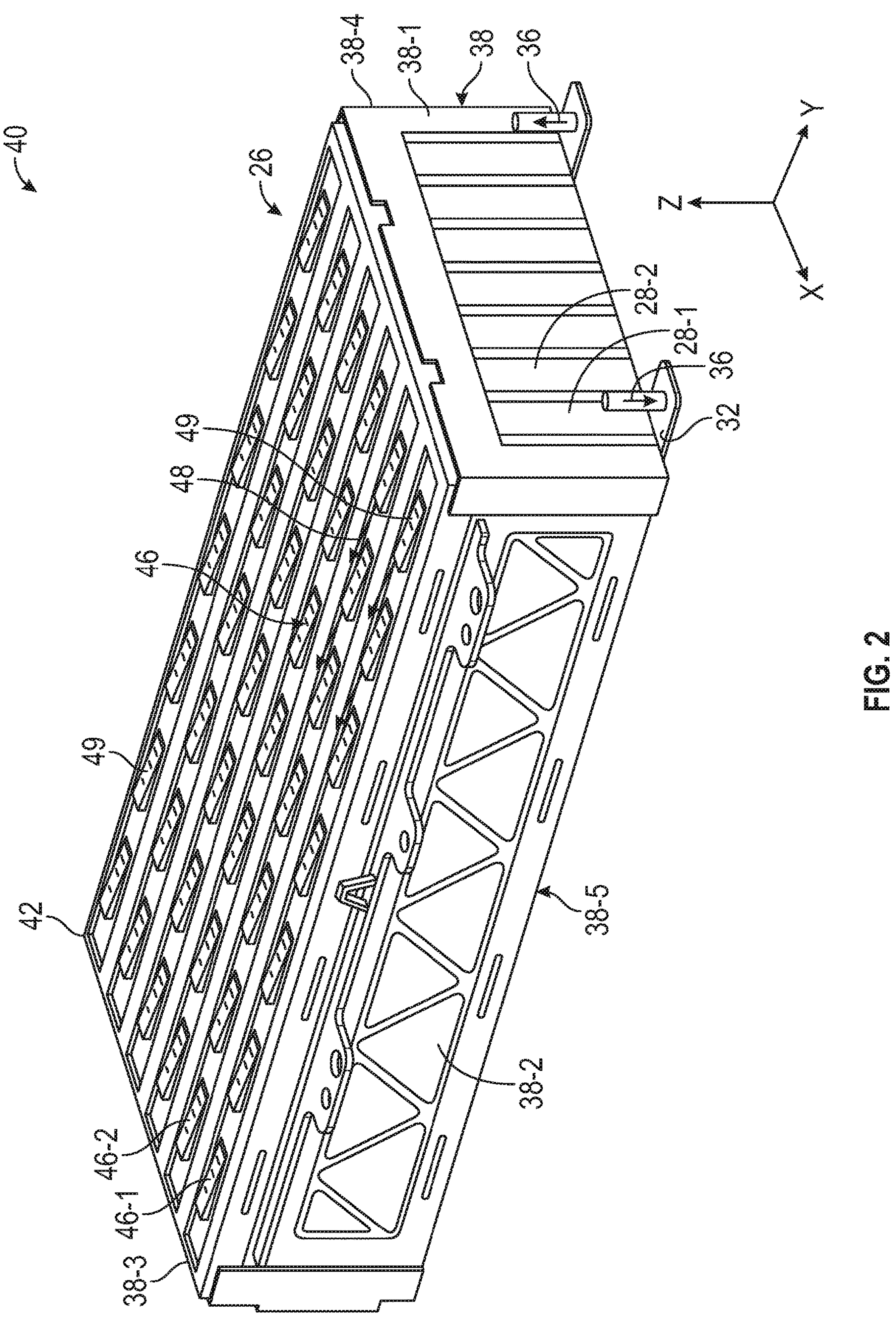
FIG. 2 is a schematic perspective view of the battery module shown in FIG. 1, having a battery module enclosure and a battery module cover with exhaust openings, according to an embodiment of the disclosure.

As shown in FIGS. 2-5, the battery system 24 may include one or more sections, such as a battery array or module 26. As shown in FIG. 2, the battery module 26 includes a plurality of battery cells, such as a first battery cell 28-1 and a neighboring, directly adjacent, second battery cell 28-2, each extending generally upward, (i.e., in the Z direction), as seen in FIGS. 2-5. Although one module 26 and two battery cells 28-1, 28-2 are shown, nothing precludes the battery system 24 from having a greater number of such modules and battery cells. The battery module 26 also includes a thermal barrier 30 arranged between the first battery cell 28-1 and the second battery cell 28-2. The thermal barrier 30 may be constructed from a high-temperature polymer foam with a stiffening substructure. The thermal barrier 30 is specifically configured to limit the amount of thermal energy transfer between the neighboring battery cells 28-1, 28-2 during battery module 26 operation.

Figure 4:
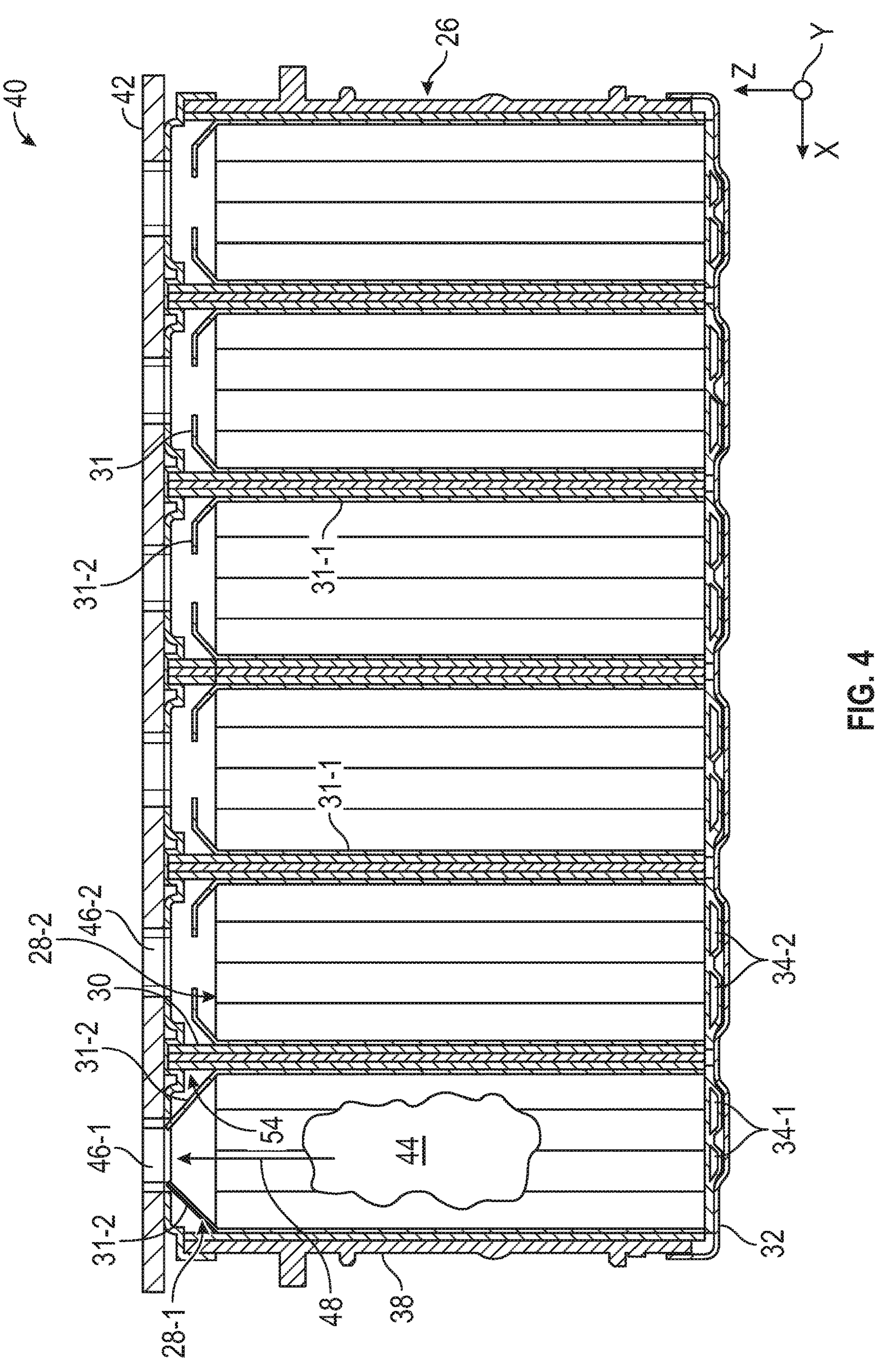
FIG. 4 is a schematic cross-sectional plan view of the battery module shown in FIG. 2 taken at line 4-4, having the battery module cover with channels engaging and nesting insulating members, according to an embodiment of the disclosure.

As shown in FIG. 4, the battery module 26 also includes insulating members 31, which includes a first portion 31-1 and a second portion 31-2. In exemplary embodiments, the insulating members 31 are at least partially disposed between the battery cells 28 and the barrier 30. The insulating members 31 include a first portion 31-1, also referred to herein as a body portion, and a second portion 31-2, also referred to herein as a tapered portion. The first portion 31-1 of the insulating member 31 is disposed between battery cells 28-1, 28-2 and thermal barrier 30 and extends along the height of the battery cells 28-1, 28-2 in the Z direction. The second portion 31-2 of the insulating member 31 is disposed above the battery cells 28. In exemplary embodiments, the second portion 31-2 has a tapered shape that is configured to direct gases generated during a thermal event towards an exhaust opening 46-1. In exemplary embodiments, insulating member 31 may, for example, be constructed from mica for the subject material's resistance to elevated temperatures.

Figure 5:
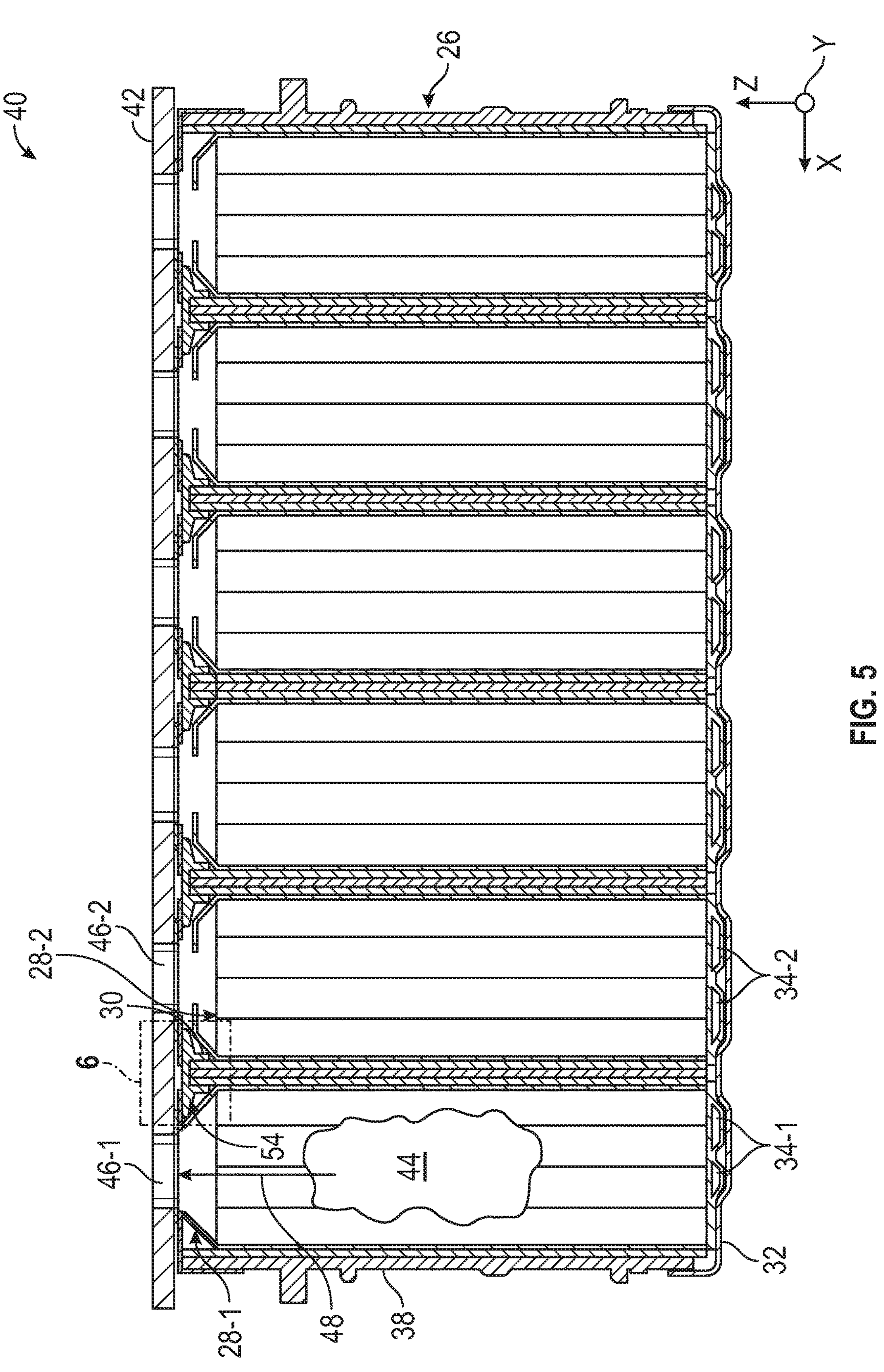
FIG. 5 is a schematic cross-sectional plan view of the battery module shown in FIG. 2, having resilient sealing elements positioned between insulating members and the battery module cover, the resilient sealing elements having channels engaging and nesting insulating members, according to an embodiment of the disclosure.

In exemplary embodiments, the second portions 31-2 of the insulating members 31 disposed adjacent to the battery cell 28-1 are configured to direct hot gasses expelled from the battery cell 28-1 away from the battery cell 28-2. In one embodiment, at least a portion of the second portions 31-2 of the insulating members 31 disposed adjacent to the battery cell 28-1 are configured to deform when exposed to the hot gasses expelled from the battery cell 28-1. For example, as shown in FIG. 5, the second portions 31-2 of the insulating members 31 are configured to deform to contact exhaust opening 46-1 to thereby form a channel to direct the flow of the hot gasses expelled from the battery cell 28-1.

As shown in FIGS. 2-5, the battery module 26 also includes a heat sink 32. The heat sink 32 is generally positioned below and in direct contact with each of the battery cells 28 to absorb thermal energy from the first and second battery cells. As shown, the heat sink 32 may be in direct physical contact with the first and second battery cells 28-1, 28-2. The heat sink 32 may be configured as a coolant plate having a plurality of coolant channels, shown as respective first and second coolant channels 34-1 and 34-2 in FIG. 4. The coolant channels 34-1, 34-2 are configured to circulate a coolant 36 (shown in FIG. 2) and thereby remove thermal energy from battery cells 28 while the battery module 26 generates/stores electrical energy. As shown in FIG. 4, the first coolant channel 34-1 may be arranged proximate to the first battery cell 28-1 and the second coolant channel 34-2 may be arranged proximate to the second battery cell 28-2.

Generally, during normal operation of the module 26, the thermal barrier 30 is effective in absorbing thermal energy released by the first and second cells 28-1, 28-2 and facilitating the transfer of the thermal energy to the heat sink 32. However, during extreme conditions, such as during a thermal event (identified via numeral 44 in FIG. 4), the amount of thermal energy released by the cell undergoing the event will typically saturate the thermal barrier 30 and exceed its capacity to absorb and efficiently transfer heat to the heat sink 32. As a result, excess thermal energy will typically be transferred between the neighboring cells 28-1, 28-2, leading to propagation of a thermal runaway through the battery module 26. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

As shown in FIGS. 2-5, the battery module 26 also includes a battery module enclosure 38 surrounded by an environment external to the battery module enclosure or ambient environment 40. The battery module enclosure 38 is configured to house each of the first battery cell 28-1, the second battery cell 28-2, the thermal barrier 30, and the heat sink 32. As shown in FIG. 2, the battery module enclosure 38 includes lateral walls, 38-1, 38-2, 38-3, 38-4, as well as a floor 38-5 mounting or incorporating the heat sink 32. The battery module 26 also includes a battery module cover 42 generally positioned above the battery cells 28 and attached to the lateral walls 38-1, 38-2, 38-3, 38-4 of the battery module enclosure 38. For example, in the event the first battery cell 28-1 experiences thermal runaway, the excess gases generated by such an event would give rise to highly elevated internal pressures having a tendency to distort the battery module cover 42 and permit the gases to pass over or leak around the thermal barrier 30 to the neighboring second battery cell 28-2. Such leakage of high-temperature gases would increase the likelihood of the thermal runaway in the battery module 26 from the first battery cell 28-1 to the second battery cell 28-2, thereby generating a chain reaction and affecting the entire battery module.

As shown, the battery module cover 42 is arranged in an X-Y plane, substantially parallel to the heat sink 32, and generally perpendicular to the first and second battery cells 28-1, 28-2. The battery module cover 42 is mounted to the battery module enclosure 38 and includes vent features 46 configured to expel high-temperature gases from one of the first and second battery cell 28-1, 28-2. The vent features 46 are additionally configured to divert, (i.e., deflect or reroute), the high-temperature gases away from the second battery cell 28-2 directly to the ambient environment 40. The battery module cover 42 is thereby configured to minimize the transfer of the high-temperature gases from one of the first and second battery cell 28-1, 28-2, to the other of the two cells and control propagation of a thermal runaway event 44 in the battery module 26. Although either the first battery cell 28-1 or the second battery cell 28-2 may generate high-temperature gases due to the thermal event 44, the present disclosure will specifically focus on an exemplary case when the first battery cell generates the subject gases.

In one embodiment, as shown in FIG. 2, the vent feature 46 may include an array of exhaust openings, depicted as a first set of exhaust openings 46-1 corresponding to the first battery cell 28-1 and a second set of exhaust openings 46-2 corresponding to the second battery cell 28-2. The battery module cover 42 may be formed, such as stamped, from mild steel with the exhaust openings 46-1, 46-2 formed into the battery module cover. The exhaust openings 46-1, 46-2 are arranged relative to the first and second battery cells 28-1, 28-2 such that the exhaust openings expel rising high-temperature gases from the uppermost/highest level within the battery module enclosure 38. Particularly, the exhaust openings 46-1 are configured to operate in the manner of a chimney to expel the high-temperature gases 48 from the first battery cell 28-1 undergoing the thermal runaway event 44 and divert the high-temperature gases away from the second battery cell 28-2 by providing a direct path to the ambient environment 40.

In one embodiment, as shown in FIG. 2, the exhaust openings 46-1, 46-2 may have a reverse scoop shape 49 configured to direct the high-temperature gases 48 generated by the first battery cell 28-1 away from the second battery cell 28-2. The reverse scoop shape 49 may be specifically configured to direct the high-temperature gases 48 at an angle greater than 90 and smaller than 180 degrees relative to the cover X-Y plane. The array of vent openings, such as having the first and second exhaust openings 46-1, 46-2, with the subject reverse scoop shape 49 may be generally defined as having a directional "cheese grater" profile relative to the environment 40. The reverse scoop shape 49 of the exhaust openings may be formed, e.g., stamped, directly into the structure of the battery module cover 42.

Figure 3:
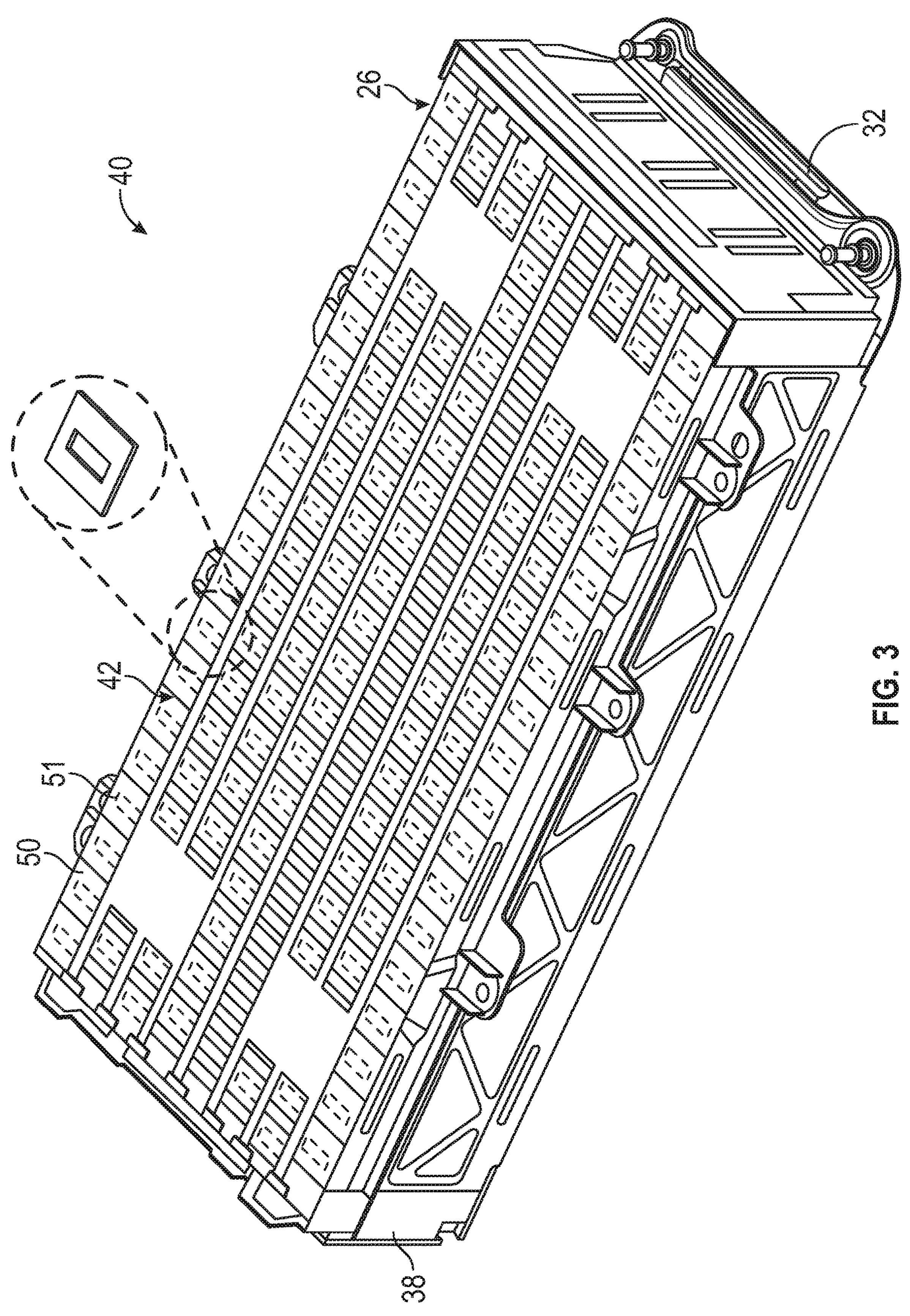
FIG. 3 is a schematic perspective view of the battery module shown in FIG. 1, having a battery module enclosure and a battery module cover with exhaust openings, wherein the battery module cover includes liner segments covering the exhaust openings, according to an embodiment of the disclosure.

In one embodiment, as shown in FIG. 3, the battery module 26 includes a liner layer 50 affixed to the battery module cover 42. The liner layer 50 includes a plurality of blow-off segments 51 configured to cover respective exhaust openings, (e.g., the first exhaust opening 46-1 and the second exhaust opening 46-2). The blow-off segments 51 are specifically configured to be either partially or entirely blown off the exhaust opening 46-1 via the pressure from the high-temperature gases 48. For example, the blow-off segments 51 may have perforated edges to facilitate their separation from the liner layer 50. Such uncovering of the exhaust opening 46-1 by the high-temperature gases 48 will permit the battery module cover 42 to expel the high-temperature gases 48 from the battery cell 28-1 to the ambient environment 40. The liner layer 50 may, for example, be constructed from mica for the subject material's resistance to elevated temperatures and be glued to the battery module cover 42 over the vent features 46. The glue employed to attach the liner segments 50 may be specifically selected to maintain attachment of the liner segments to the battery module cover 42 under normal module operating conditions and give way under high gas pressure during a thermal runaway.

Figure 6:
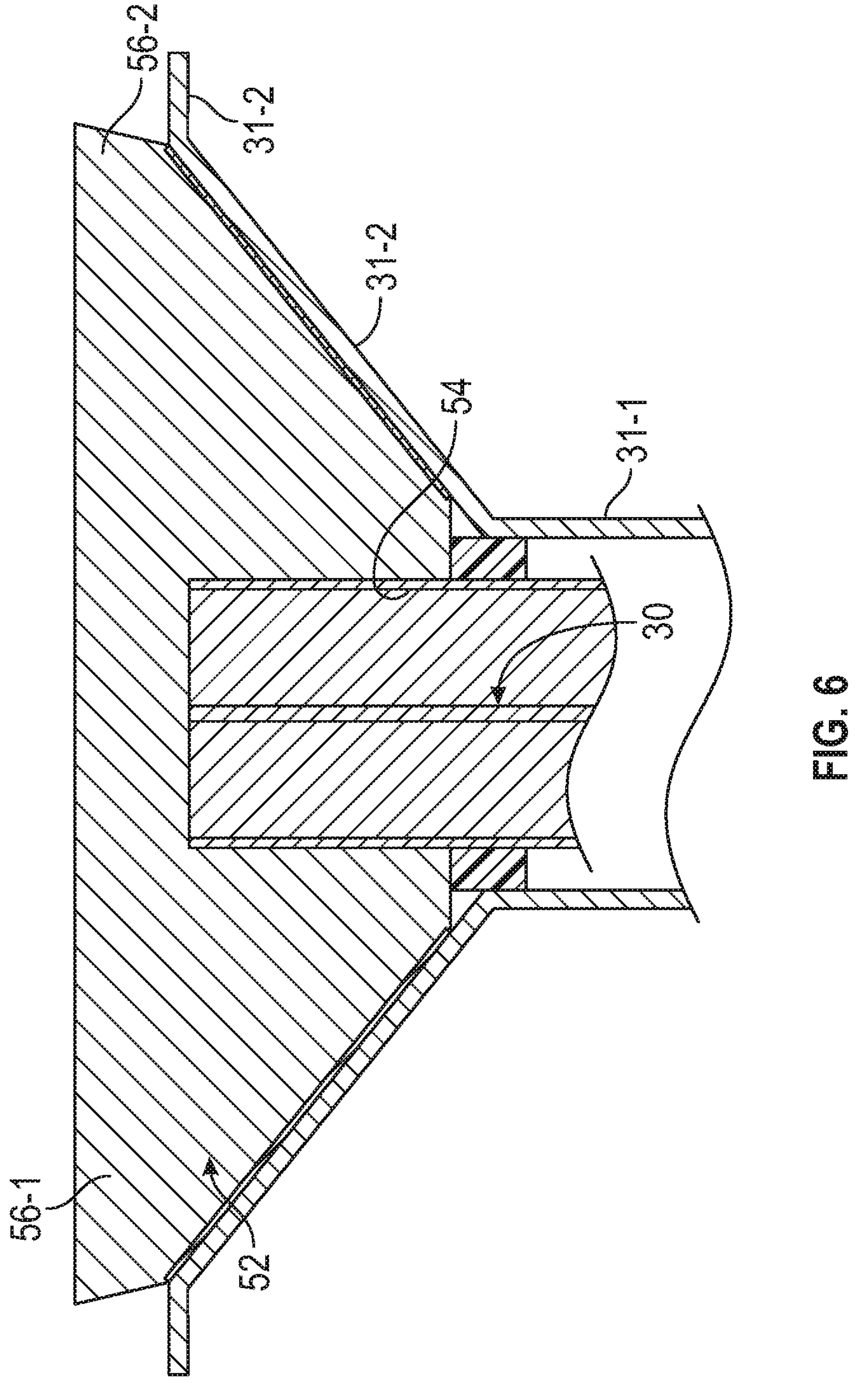
FIG. 6 is a schematic close-up view of a particular section of the battery module shown in FIG. 5, depicting a cross-section of the resilient sealing element, according to an embodiment of the disclosure.

As shown in FIGS. 5 and 6, the vent feature 46 may additionally include resilient elements 52. Each resilient element 52 may be positioned between the respective thermal barrier 30 and the battery module cover 42. The resilient elements 52 may be constructed from a heat-resistant flexible material, such as silicon. The resilient elements 52 are specifically configured to maintain contact with a portion of the insulating member 31 under pressure from the high-temperature gases generated by the battery cells 28-1, 28-2. In exemplary embodiments, the resilient elements 52 are configured to control the movement or deformation of the insulating member 31 due to the pressure from the high-temperature gases generated by the battery cells 28-1, 28-2. The resilient sealing elements 52 thereby facilitate the expelling of, for example, the high-temperature gases 48 from the first battery cell 28-1 to the ambient environment 40 through the exhaust openings 46-1.

FIG. 6 is a close-up view of section 6 shown in FIG. 5. As illustrated in FIG. 6, each resilient element 52 may include, (i.e., define), a channel 54 configured to engage and nest the thermal barrier 30. Such construction of the interface between the resilient element 52 and the thermal barrier 30 is intended to minimize deformation of the subject insulating member(s) 31 under pressure, such as from high-temperature gases 48. Each resilient element 52 may further include lateral sections 56-1 and 56-2 arranged distally from the channel 54. The lateral sections 56-1 and 56-2 are configured to maintain contact with the battery module cover under pressure from the high-temperature gases, such as the gases 48, to thereby minimize transfer or leakage of the subject gases between the first and second battery cells 28-1, 28-2. Alternatively, as shown in FIG. 4, the channel(s) 54 may be incorporated directly into the battery module cover 42 to engage and nest the thermal barrier(s) 30 to maintain separation between the respective battery cells, e.g., the first and second battery cells 28-1, 28-2, and minimize deformation of the respective insulating member(s) 31 under increased pressures.

Overall, during operation of the battery module 26, the vent feature 46 is configured to automatically transfer directly to the ambient environment excess thermal energy generated by a thermal runaway event in a particular battery cell of the battery module. Such transfer of the excess thermal energy out of the battery module 26 is intended to control propagation of thermal runaway to other, neighboring cells in the battery module. Specifically, the battery module 26 includes insulting members 31 that are configured to direct the flow of high-temperature gasses 48 generated by a battery cell during a thermal runaway event 44. In addition, the vent feature 46 may include exhaust openings. (e.g., 46-1, 46-2), and supporting structures to minimize the transfer of high-temperature gases from the battery cell undergoing the thermal runaway to a neighboring battery cell, thereby facilitating the transfer of such gases to the ambient environment 40. Thus, the insulting members 31 and the vent features 46 are particularly effective in mitigating the propagation of a thermal runaway between individual battery cells within the battery module 26, without requiring additional external hardware or controls.

Figure 7:
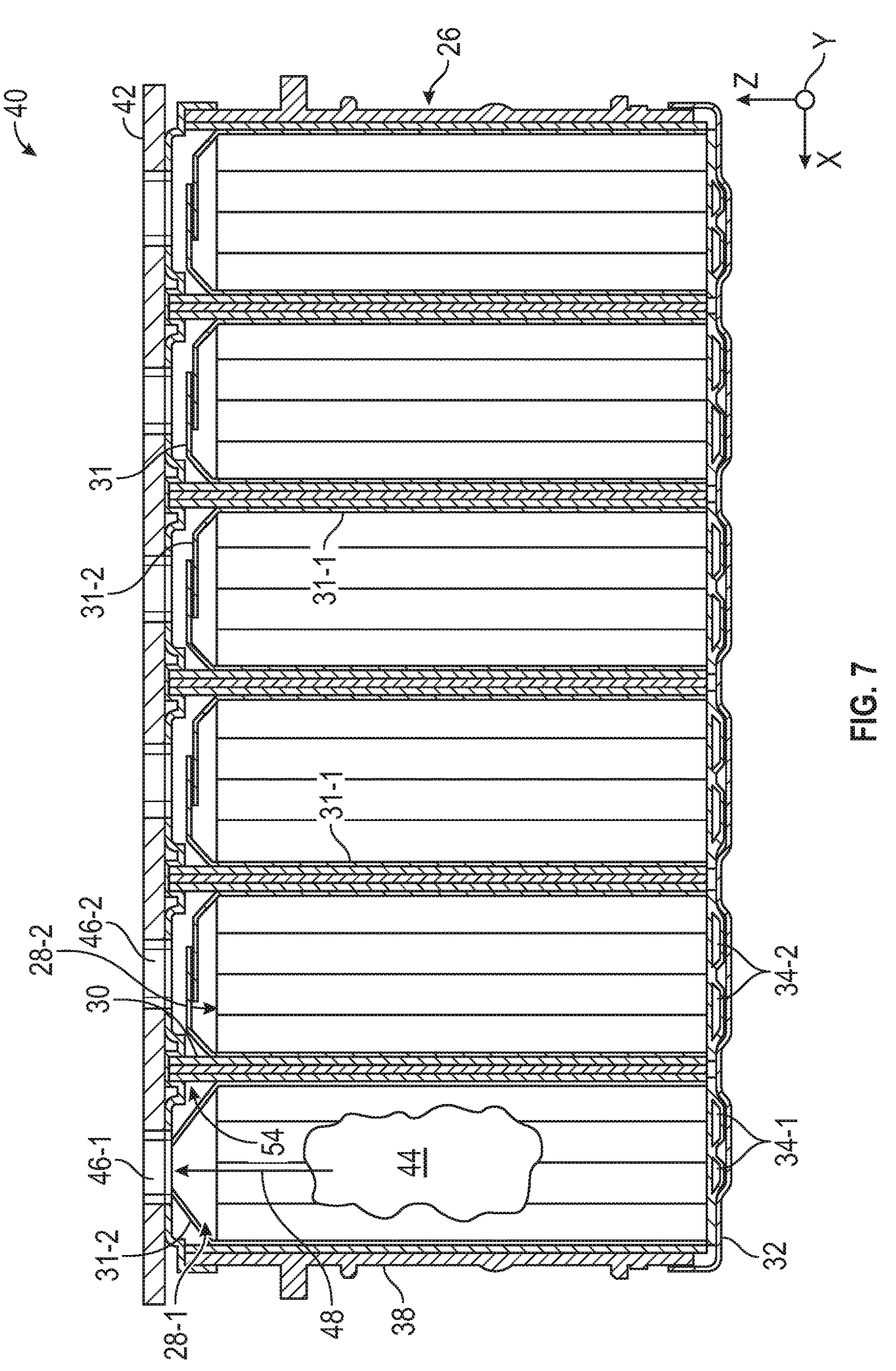
FIG. 7 is a schematic cross-sectional plan view of the battery module shown in FIG. 2, having the battery module cover with channels engaging and nesting insulating members, according to an embodiment of the disclosure.

In one embodiment, as shown in FIG. 7, the second portion 31-2 of the insulating members 31 disposed on the opposite sides of the battery cells 28 are configured to at least partially overlap one another. In one embodiment, the second portion 31-2 of the insulating members 31 disposed on the opposite sides of the battery cells 28 may be in contact with one another. In another embodiment, an air gap may be present between the overlapping sections of the second portion 31-2 of the insulating members 31 disposed on the opposite sides of the battery cells 28. In exemplary embodiments, at least a portion of the second portions 31-2 of the insulating members 31 disposed adjacent to the battery cell 28-1 are configured to deform when exposed to the hot gasses expelled from the battery cell 28-1. For example, as shown in FIG. 5, the second portions 31-2 of the insulating members 31 are configured to deform to contact exhaust opening 46-1 to thereby form a channel to direct the flow of the hot gasses expelled from the battery cell 28-1.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery module comprising:

a first battery cell, a neighboring second battery cell, and insulating members positioned on opposing sides of the first battery cell;

a battery module enclosure surrounded by an external environment and configured to house each of the first battery cell, the neighboring second battery cell, and the insulating members; and a module cover mounted to the battery module enclosure and including a vent feature configured to expel high-temperature gases from the first battery cell into the external environment, to thereby minimize transfer of the high-temperature gases from the first battery cell to the neighboring second battery cell and control propagation of a thermal event in the battery module, wherein the insulating members include tapered portions disposed between the first battery cell and the vent feature, the tapered portions being configured to direct the high-temperature gases from the first battery cell away from the neighboring second battery cell and towards the vent feature, wherein at least part of the tapered portions of the insulating members overlap each other and are configured to deform and to contact the vent feature in response to the high-temperature gases being expelled from the first battery cell.

2. The battery module of claim 1, wherein the vent feature includes exhaust openings configured to expel the high-temperature gases from the first battery cell.

3. The battery module of claim 2, wherein at least one of the exhaust openings has a reverse scoop shape configured to direct the high-temperature gases away from the neighboring second battery cell.

4. The battery module of claim 2, wherein the vent feature includes liner segments configured to cover the exhaust openings and be blown off the exhaust openings by the high-temperature gases to thereby expel the high-temperature gases from the first battery cell to the external environment.

5. The battery module of claim 4, wherein the liner segments are glued to the battery module cover.

6. The battery module of claim 4, wherein the liner segments are constructed from mica.

7. The battery module of claim 1, wherein the insulating members are constructed from mica.

8. The battery module of claim 1, further comprising a thermal barrier disposed adjacent to the insulating members.

9. The battery module of claim 1, wherein the insulating members include a body portion that extends along a height of the first battery cell.

10. The battery module of claim 1, further comprising a thermal barrier disposed between the first battery cell and the neighboring second battery cell, and a resilient element positioned between the thermal barrier and the module cover, the resilient element including a channel configured to engage and nest the thermal barrier.

11. A motor vehicle comprising:

a power-source configured to generate power-source torque; and a battery module configured to supply electrical energy to the power-source, the battery module including:

a first battery cell, a neighboring second battery cell, and insulating members positioned on opposing sides of the first battery cell;

a battery module enclosure surrounded by an external environment and configured to house each of the first battery cell, the neighboring second battery cell, and the insulating members; and a module cover mounted to the battery module enclosure and including a vent feature configured to expel high-temperature gases from the first battery cell into the external environment, to thereby minimize transfer of the high-temperature gases from the first battery cell to the neighboring second battery cell and control propagation of a thermal event in the battery module, wherein the insulating members include tapered portions disposed between the first battery cell and the vent feature, the tapered portions being configured to direct the high-temperature gases from the first battery cell away from the neighboring second battery cell and towards the vent feature, wherein at least part of the tapered portions of the insulating members overlap each other and are configured to deform and to contact the vent feature in response to the high-temperature gases being expelled from the first battery cell.

12. The motor vehicle of claim 11, wherein the vent feature includes exhaust openings configured to expel the high-temperature gases from the first battery cell.

13. The motor vehicle of claim 12, wherein at least one of the exhaust openings has a reverse scoop shape configured to direct the high-temperature gases away from the neighboring second battery cell.

14. The motor vehicle of claim 12, wherein the vent feature includes liner segments configured to cover the exhaust openings and be blown off the exhaust openings by the high-temperature gases to thereby expel the high-temperature gases from the first battery cell to the external environment.

15. The motor vehicle of claim 14, wherein the liner segments are glued to the battery module cover.

16. The motor vehicle of claim 14, wherein the liner segments are constructed from mica.

17. The motor vehicle of claim 11, wherein the insulating members are constructed from mica.

18. The motor vehicle of claim 11, further comprising a thermal barrier disposed adjacent to the insulating members.

19. The motor vehicle of claim 11, wherein the insulating members include a body portion that extends along a height of the first battery cell.

20. The motor vehicle of claim 11, wherein the battery module further comprises a thermal barrier disposed between the first battery cell and the neighboring second battery cell, and a resilient element positioned between the thermal barrier and the module cover, the resilient element including a channel configured to engage and nest the thermal barrier.

* * * * *